June 28, 1938. J. DEMAS 2,122,248

CIRCUIT CLOSER FOR ALARMS

Filed Jan. 14, 1936 2 Sheets-Sheet 1

INVENTOR
John Demas
BY
ATTORNEY

June 28, 1938.   J. DEMAS   2,122,248
CIRCUIT CLOSER FOR ALARMS
Filed Jan. 14, 1936   2 Sheets-Sheet 2
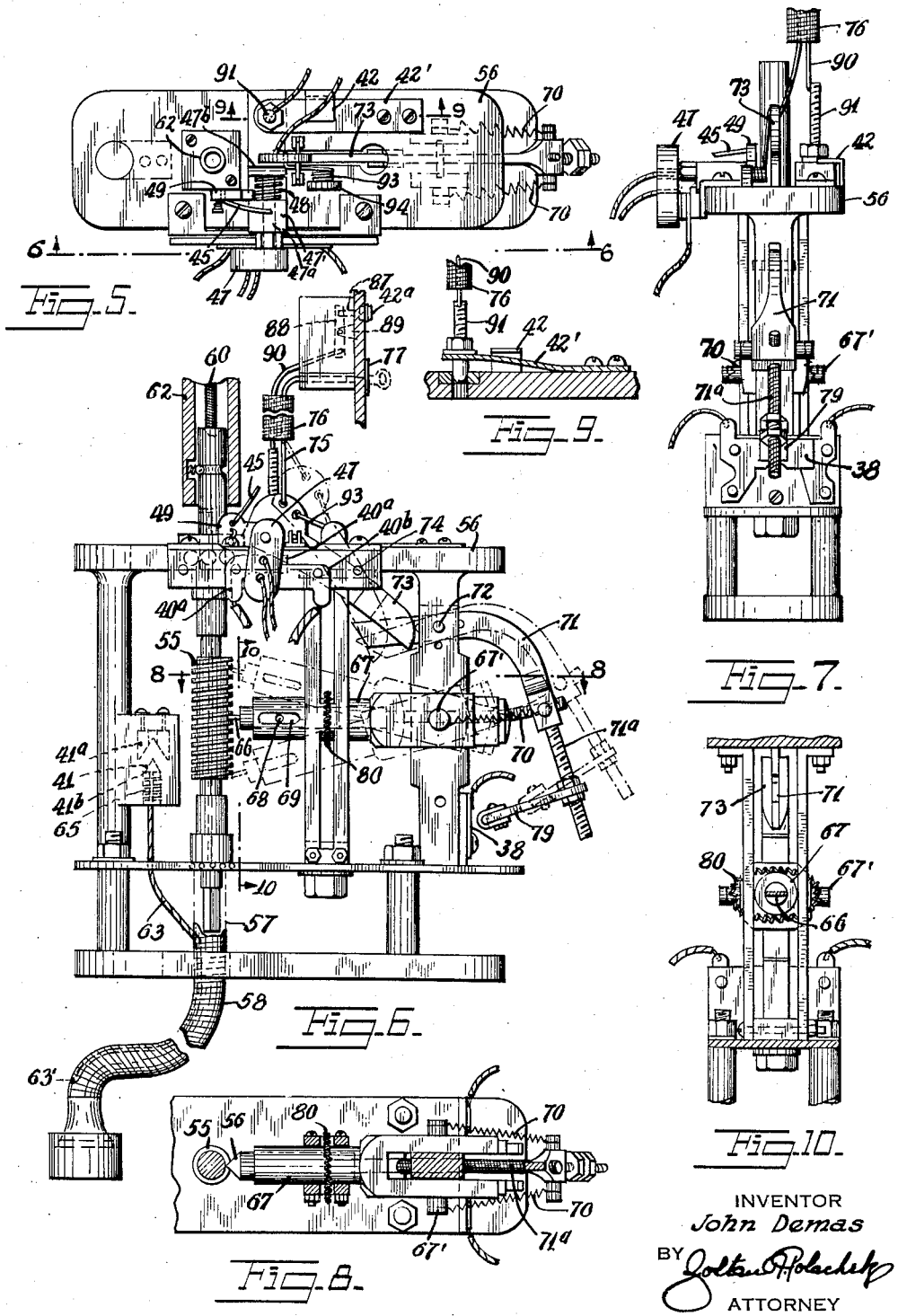

Patented June 28, 1938

2,122,248

UNITED STATES PATENT OFFICE 2,122,248

CIRCUIT CLOSER FOR ALARMS

John Demas, New York, N. Y.

Application January 14, 1936, Serial No. 59,024

2 Claims. (Cl. 200—52)

This invention relates to new and useful improvements in a warning alarm for vehicles.

The invention has for an object the construction of a warning alarm which is adapted to be mounted beneath the dashboard of a vehicle and which is constructed so as to be jimmy proof and fool proof and prevent the vehicle from being stolen.

More specifically, it is contemplated to construct the warning alarm with a body which is adapted to be mounted beneath the dashboard of the vehicle, and which has a front grille, and houses an alarm, through which the sounds of the alarm may emanate.

It is a further object of this invention to provide mechanism which is connected with the speedometer cable of the vehicle for causing the operation of the alarm if attempts are made to tow the vehicle away.

Furthermore, the invention contemplates the provision of a mechanism to sound the alarm should the speedometer cable be cut with a view of preventing the sounding of the alarm when the vehicle is towed.

A further object of the invention is the provision of a mechanism associated with the conventional ignition lock of the vehicle which is adapted to render the warning alarm inoperative when the ignition lock is opened with the key.

A further object of the invention is the provision of a mechanism capable of sounding an alarm should the body of the device be opened, except if it is opened by an authorized key.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:—

Fig. 5 is a fragmentary enlarged detailed view showing specifically the mechanism for sounding the alarm in the event that the vehicle is being towed.

Fig. 6 is an elevational view of Fig. 5 looking in the direction of the line 6—6 thereof.

Fig. 7 is an end elevational view of Fig. 6 looking from the right hand end.

Fig. 8 is a fragmentary sectional view taken on the line 8—8 of Fig. 6.

Fig. 9 is a sectional view taken on the line 9—9 of Fig. 5.

Fig. 10 is a sectional view taken on the line 10—10 of Fig. 6.

Figure 1:
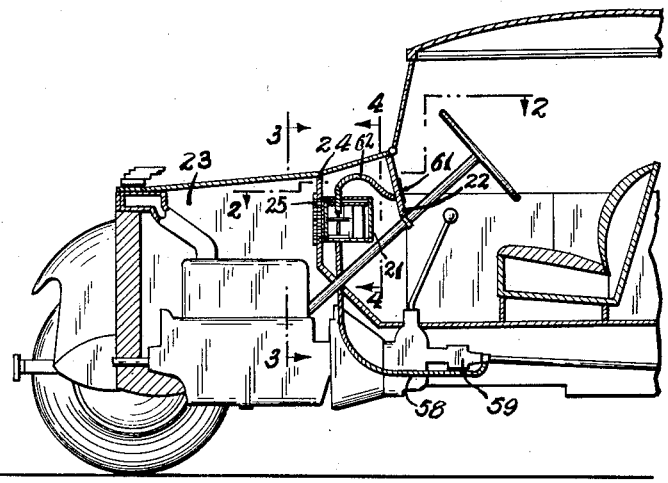
Fig. 1 is a fragmentary sectional view of a vehicle equipped with an alarm according to this invention.
Figure 2:
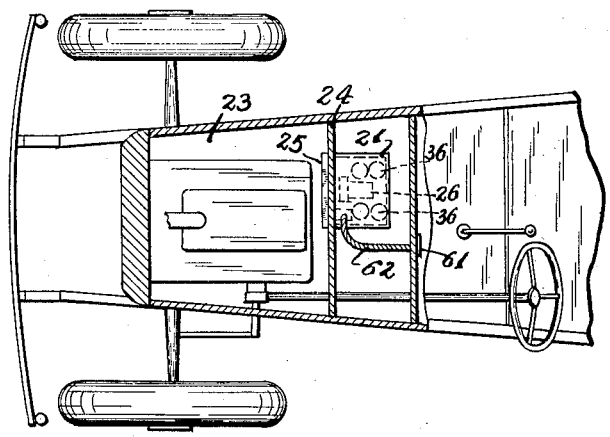
Fig. 2 is a horizontal sectional view taken on the line 2—2 of Fig. 1.
Figures 3, 4:
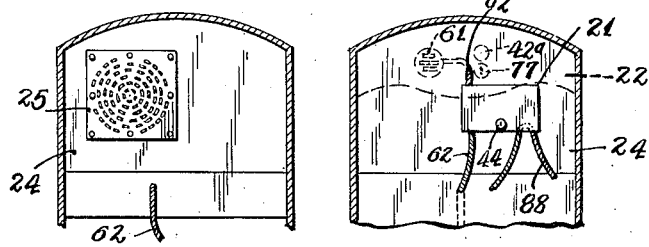
Fig. 3 is a sectional view taken on the line 3—3 of Fig. 1.
Fig. 4 is a sectional view taken on the line 4—4 of Fig. 1.

The warning alarm for vehicles, according to this invention, comprises a body 21 adapted to be mounted beneath the dashboard 22 of a motor vehicle 23, and more specifically, upon the partition 24 which divides off the interior of the body of the vehicle from the motor containing hood. The body 21 is provided with a front grille 25 through which the sounds of an alarm, such as the siren 26, may pass.

The switch 42 is mounted on the dashboard of the vehicle and serves as a police switch by which the siren may be sounded irrespective of the fact that the other switches are open or closed.

The body 21 is provided with a cover 43 which is hingedly mounted so as to be openable.

This cover is normally held closed with a lock 44. A mechanism is provided for sounding the alarm in the event that the cover 43 is opened without proper operation of the lock 44. This mechanism consists of a cable which is attached to the body of the lock 44 and which connects with a switch 40.

This switch 40 is shown in the regular fashion in Figs. 8 and 9. It consists of a terminal 40a and a terminal 40b mounted upon the side of an insulation block. These terminals connect with the necessary leads. They are normally spaced from each other and may be urged into contact by a head element 47. This head element normally is urged to close the spring terminals 40a and 40b by a spring 48. This spring is mounted upon a stem connected with the head 47. The stem is restrained from moving by a pivotally mounted cam 49. The cable 45 connects with the cam 49. The arrangement is such that when the cable 45 is drawn the cam 49 will be pivoted so as to move clear from the stem and then the spring 48 will be free to move the head 47 and forms a part thereof. The cam 49 engages against one side of the block 47. The spring 48 acts between the block 47' and a head 47b fixed upon the stem 47a.

The mechanism which controls the sounding of the alarm when the vehicle is towed consists of a screw 55 rotatively supported in a bracket 56 mounted in suitable lubricated ball bearings within the body 21. This screw is connected by a suitable flexible cable 57 which extends through a flexible casing 58 to the transmission casing 59 of the vehicle. At this point the cable 57 is connected by suitable gears (not shown on the drawings) with the transmission shaft so that the screws 55 is rotated when the vehicle moves.

The screw 55 at the top connects with a suitable cable 60 by a resilient ball and groove arrangement, and the cable 60 connects with the speedometer 61 of the vehicle. The specific details of the speedometer or the cables which operate the speedometer will not be given in this specification as they are conventional. The cable 60 passes through a casing 62 which extends from the body 21 to the speedometer 61. If the casing 62 and the cable 60 are cut by thieves, it will merely result in disconnecting the speedometer but the alarm will be sounded just the same. A provision is made so that in event the casing 58 and the cable 57 are cut, the alarm will be sounded. This provision consists in a small cord or cable 63 extending through the casing 58 and attached at its inner end 63' to the extremity of the casing 58. The other end of the cord or cable 63 connects with the switch 41. The switch 41 comprises a stationary terminal 41a and a terminal 41b which may be engaged with the stationary terminal by the action of a spring 65. This spring is normally held in check by the cable 63, but should the cable 63 be cut the switch 41 automatically closes and the alarm is sounded.

The screw 55 is engageable by a follower 66 which is slidably mounted in an arm 67 pivotally supported at the point 67' upon the bracket 56. The follower 66 slidably extends through the arm 67 and is limited in its motion by a pin 68 from the follower engaging in an elongated slot 69 in the arm 67. The follower 66 extends out from the rear end of the arm and connects with a flexible cable 70, which in turn is connected with a lever 71. This lever 71 is pivoted by a pin 72 to the bracket 56.

The top extremity of the lever 71 is engaged by a lever 73 which is pivotally mounted intermediate of its ends by a pin 74. This lever 73 may be moved upwards from the full line position shown in Fig. 6 to the dot and dash line position in order to pivot the lever 71 from the full line position to the dot and dash line position. In the dot and dash line position of the lever 71 the follower 66 will be retracted and out of contact with the screw 55. The lever 73 connects with a cable 75 which extends through a casing 76 and connects with the ignition lock 77 on the dashboard of the vehicle. This ignition lock is of conventional design which is opened by a key, and upon being opened has a turning or moving part capable of drawing the cable 75. Thus, when the ignition lock 77 is opened the cable 75 is drawn to pivot the lever 73 to the dot and dash position and so cause the follower 66 to be moved out of contact with the screw 55.

The electric lines for the police switch 42 also pass through the casing of cable 76. The lever 71 has a tail portion 71a upon which a master arm 79 is adjustably mounted. This arm may be adjusted to the correct position so that when the arm 67 is in the neutral position, indicated by the full lines in Fig. 6, the arm 79 is also in a neutral position. The arm 67 is normally urged into the neutral position by a resilient or elastic band 80 which encircles the arm and connects with the bracket 56. The master arm 79 is capable of operating the switch 38 under certain circumstances. These conditions are determined by the engagement of the follower 66 with the screw 55.

In the event that the vehicle is towed and the ignition lock 77 is not open, the follower 66 is moved by the screw 55 either upwards or downwards, depending in which direction the vehicle is towed. It will soon reach the dot and dash line positions shown in Fig. 6. In either of these positions it will draw in the lower end of the lever 71 so as to cause the arm 79 to engage against the switch 38 which is merely in the form of superimposed adjacent springs so as to close these springs. The closing of the switch 38 will result in the alarm being sounded.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. In a circuit closer for alarms, a body adapted to be mounted upon the dashboard of a vehicle, a screw within said body driven by a housed cable connected with the transmission of said vehicle, a circuit for sounding said alarm, a means for closing said circuit, comprising an arm pivotally mounted in a bracket, a follower resiliently mounted in one end of said arm and adapted to engage said screw, a spring mounted on the other end of said arm, a lever pivoted on said bracket above said arm and connected to said spring, a master switch mounted on said bracket below said arm, a tail arm mounted on said lever and having a master arm adapted to close said master switch.

2. In a circuit closer for alarms, a body adapted to be mounted upon the dashboard of a vehicle, a screw within said body, a housed cable having one end connected to said screw and having the other end connected to the transmission of said vehicle to rotate said screw when said vehicle is moved, a circuit for sounding said alarm, an arm pivotally mounted in said body, a follower mounted in one end of said arm and adapted to engage said screw, a lever pivotally mounted in said body and above the pivoted point of said arm, a spring having one of its ends connected to the other end of said arm and having the other of its ends connected to said lever, a master switch fixedly mounted in said body below the pivoted point of said arm, and a master arm mounted on said lever, whereby said arm pivots when said screw is rotated to pivot said lever and engage said master arm with said master switch to close said circuit.

JOHN DEMAS.